United States Patent [19]

Klinedinst

[11] Patent Number: 5,674,440
[45] Date of Patent: Oct. 7, 1997

[54] DIE HEAD WITH ADJUSTABLE MANDREL AND METHOD

[75] Inventor: Paul W. Klinedinst, Windsor, Pa.

[73] Assignee: Graham Engineering Corporation, York, Pa.

[21] Appl. No.: 437,435

[22] Filed: May 5, 1995

[51] Int. Cl.⁶ .................................................. B29C 47/22
[52] U.S. Cl. .................. 264/40.5; 264/40.6; 264/541; 264/209.2; 264/209.8; 264/295; 264/339; 264/514; 264/515; 425/133.1; 425/141; 425/144; 425/532; 425/381; 425/466; 425/467; 425/403
[58] Field of Search .................... 264/209.2, 209.8, 264/40.5, 295, 339, 514, 515; 425/380–381, 467, 466, 141, 532, 143, 403, 144, 379.1, 133.1

[56] References Cited

U.S. PATENT DOCUMENTS

| | | | |
|---|---|---|---|
| 2,549,569 | 4/1951 | Bradley . | |
| 2,814,070 | 11/1957 | Bulkley et al. | 18/12 |
| 3,023,461 | 3/1962 | Sherman | 18/55 |
| 3,079,636 | 3/1963 | Aykanian | 18/14 |
| 3,261,893 | 7/1966 | George et al. | 264/40 |
| 3,341,388 | 9/1967 | Bunyea | 156/244 |
| 3,369,272 | 2/1968 | Martin, Jr. et al. | 18/5 |
| 3,470,582 | 10/1969 | Martin, Jr. . | |
| 3,535,739 | 10/1970 | Mehnert | 425/141 |
| 3,579,731 | 5/1971 | Cooper | 18/13 |
| 3,608,145 | 9/1971 | Baker et al. | 18/12 |
| 3,751,537 | 8/1973 | Scotto et al. | 264/40.6 |
| 3,761,553 | 9/1973 | Richardson | 264/40 |
| 3,767,346 | 10/1973 | Mihalik | 425/378 |
| 3,819,775 | 6/1974 | Mules | 264/40 |
| 3,883,279 | 5/1975 | Heyer | 425/141 |
| 3,923,439 | 12/1975 | Isley et al. | 425/150 |
| 3,940,221 | 2/1976 | Nissel | 425/141 |
| 4,029,458 | 6/1977 | Kim et al. | 425/135 |
| 4,038,017 | 7/1977 | Langenecker | 425/466 |
| 4,047,868 | 9/1977 | Kudo et al. | 264/171.28 |
| 4,097,213 | 6/1978 | McComb et al. | 425/376 |
| 4,108,590 | 8/1978 | Kontz | 425/466 |
| 4,125,350 | 11/1978 | Brown | 425/381 |
| 4,129,630 | 12/1978 | Etchu et al. | 264/22 |
| 4,171,195 | 10/1979 | Klein et al. | 425/141 |
| 4,212,620 | 7/1980 | McLaren | 425/381 |
| 4,252,519 | 2/1981 | Farmer et al. | 425/466 |
| 4,281,980 | 8/1981 | Hoagland et al. | 425/461 |
| 4,332,543 | 6/1982 | Fulton et al. | 425/461 |
| 4,368,026 | 1/1983 | Budel et al. | 425/467 |
| 4,394,116 | 7/1983 | Kuenzig et al. | 425/192 |
| 4,432,718 | 2/1984 | Wurzer | 264/209.2 |
| 4,454,084 | 6/1984 | Smith et al. | 264/40.1 |
| 4,472,129 | 9/1984 | Siard | 425/381 |
| 4,507,073 | 3/1985 | Shelton | 425/466 |
| 4,512,943 | 4/1985 | Hahn et al. | 264/173 |
| 4,514,348 | 4/1985 | Iguchi et al. | 264/40.1 |
| 4,517,145 | 5/1985 | Knope | 264/40.2 |
| 4,548,570 | 10/1985 | Hahn et al. | 425/141 |
| 4,592,710 | 6/1986 | Reifenhauser et al. | 425/141 |
| 4,594,063 | 6/1986 | Reifenhauser et al. | 425/141 |
| 4,726,752 | 2/1988 | Vandun | 425/141 |
| 4,797,083 | 1/1989 | Reifenhauser | 425/378.1 |
| 4,798,526 | 1/1989 | Briggs et al. | 264/171.28 |
| 4,854,844 | 8/1989 | Carlsen | 425/141 |

(List continued on next page.)

FOREIGN PATENT DOCUMENTS

| | | | |
|---|---|---|---|
| 162462 | 2/1953 | Australia . | |
| 1037697 | 8/1958 | Germany . | |
| 62-11623 | 1/1987 | Japan | 425/144 |
| 373176 | 12/1963 | Switzerland . | |
| 373553 | 1/1964 | Switzerland . | |
| 1004332 | 9/1965 | United Kingdom . | |
| 1396538 | 6/1975 | United Kingdom . | |

*Primary Examiner*—Jeffery R. Thurlow
*Attorney, Agent, or Firm*—Thomas Hooker, P.C.

[57] ABSTRACT

A die head for extruding an annular body includes a mandrel having a warp portion with a number of segments spaced around the circumference of the mandrel. Heat is selectively flowed to the segments to warp the mandrel and vary the position of a die pin on the end of the mandrel in a die bushing to control the thickness of the extruded body.

46 Claims, 4 Drawing Sheets

U.S. PATENT DOCUMENTS

| | | | |
|---|---|---|---|
| 4,882,104 | 11/1989 | Dobrowsky | 425/144 |
| 4,895,744 | 1/1990 | Briggs et al. | 264/515 |
| 4,995,800 | 2/1991 | Lupke | 425/131.1 |
| 5,051,082 | 9/1991 | Hattori et al. | 425/141 |
| 5,102,602 | 4/1992 | Ziegler | 425/141 |
| 5,110,518 | 5/1992 | Halter | 264/40.1 |
| 5,116,211 | 5/1992 | Shinmoto | 425/141 |
| 5,120,212 | 6/1992 | Reiber et al. | 425/141 |
| 5,217,721 | 6/1993 | Reifenhauser | 425/72.1 |
| 5,253,992 | 10/1993 | Reiffenhauser | 425/72.1 |
| 5,259,747 | 11/1993 | Cloeren | 425/141 |

DIE HEAD WITH ADJUSTABLE MANDREL AND METHOD

FIELD OF THE INVENTION

The invention relates to die heads for extruding an annular body, typically a parison, through a die and particularly to adjustment of a die pin in a die bushing to control the wall thickness of the extruded parison.

BRIEF DESCRIPTION OF THE PRIOR ART

Die heads for extruding plastic parisons used for blow molding bottles include an elongate mandrel having a die pin on the down-stream end of the mandrel. A die bushing surrounds the die pin and with the pin defines an annular die opening through which molten plastic is extruded from the head as a parison. The location of the die pin in the die bushing controls the shape of the die opening and the wall thickness of the parison. If the die pin is located to one side of the bushing, the parison will be thin on one side and thick on the opposite side. If the die pin is located axially or concentrically in the die bushing, then the parison will have a uniform wall thickness.

In order to make some blow molded bottles, it is desirable to extrude a uniform wall thickness parison. In order to make other blow molded bottles, it is desirable to extrude a parison in which the wall thickness on one side is greater than the wall thickness on the other side of the parison. The circumferential location of the thick and thin portions of the parison wall depend upon the particular bottle to be blow molded. The shape of the die opening commonly must be changed when the blow molding machine is changed over to make a different bottle.

In conventional parison extrusion die heads, the shape of the die opening between the die pin and die bushing is adjusted by laterally shifting the die bushing relative to the die pin. This is done by manually loosening and tightening four radial bolts mounted on the die end of the head and engaging the die bushing at 90 degree locations around the circumference of the bushing.

Manual adjustment of the die bushing to control the thickness of the parison is a difficult, imprecise, and time-consuming process. The extrusion end of the die head is located closely adjacent to a blow molding machine where, during operation, molds are rapidly moved toward and away from the die head. There is limited space available for an operator to reach and adjust the bolts securing the die bushing. The actual movement of the die bushing in response to tightening or loosening of the bolts is not assured because of stick slip due to the tightness with which the bushing is held in place by a clamp nut.

Because of the limited space available for access to the bolts, the high operating temperature of the die head and the movement of the molds toward and away from the die head, it is not possible to adjust the die ring during extrusion and blow molding. The entire blow molding machine must be shut down in order to permit an operator to tighten and loosen the bolts and adjust the bushing relative to the die pin. This operation itself is difficult because of the possibility of being burned and being cut by sharp edges adjacent the die end of the head. There is considerable down time and lost production during adjustment of the bushing. Further, there is no assurance that the adjustment made by loosening or tightening the bolts will in fact locate the bushing in the desired positive relative to the die pin. The actual position of the bushing and pin must be determined by re-starting the entire blow molding machine, blowing bottles with the bushing in its new position and then checking the wall thickness of the bottles to determine whether the required adjustment has been achieved. Frequently, it is necessary to shut down the machine an additional time to make further adjustments in order to achieve a desired positioning of the bushing relative to the pin.

With a skilled operator, each adjustment of the bushing requires shutting down of the entire blow molding machine for at least five minutes. A skilled operator may be able to adjust the parison thickness properly in a few adjustments. An unskilled operator may require a number of hours of down time in order to properly adjust parison thickness.

SUMMARY OF THE INVENTION

The invention relates to an improved extrusion die head in which the position of the die pin in the die bushing is automatically adjusted during extrusion without the necessity of performing a mechanical adjustment on the head. The position of the die pin in the bushing is adjusted by selectively heating and warping a portion of mandrel in response to an appropriate input from a controller. The extent and direction of warping of the mandrel and resultant movement of the pin in the fixed die bushing are automatically and repeatably controlled by the operator during extrusion and blow molding.

The base of the mandrel is warped in response to elongation and shortening of the circumferentially spaced quadrants or sections in the mandrel. Four heaters are provided in the mandrel at 90 degree locations spaced around the mandrel. The heaters are selectively energized to supply heat to the quadrants of the mandrel to extend the quadrants and warp the mandrel so that the die pin supported on the free end of the mandrel is moved in the die bushing a desired amount in a desired direction in the die bushing to adjust the shape of the die opening and the thickness of the parison as required.

The heaters flow additional heat into the die head in order to locate the die pin in a desired position in the die bushing. In order to assure that this heat does not adversely heat and degrade the resin flowing through the die head, heat sinks are provided in the mandrel between adjacent quadrants. The heat sinks are air flow passages. Air flowed through the passages removes the heat supplied by the heaters without affecting the location of the die pin. In some applications, particularly when a high temperature resin is extended, the additional heat from the heaters is retained in the die head and used to maintain the high operating temperature of the head.

The amount of energy supplied to the heaters is determined by a programmable logic computer easily controlled by the operator during operation of the die head and blow molding machine. The thickness of the parison may be automatically controlled on-the-fly without the necessity of shutting down the machine or the necessity of performing an adjustment operation at the die end of the head. The PLC assures that the operator can, with reliability, move the die pin to a desired location in the die bushing, thereby permitting ready return of the pin to a desired location after changeover to a new bottle or adjustment during a production run.

Other objects and features of the invention will become apparent as the description proceeds, especially when taken in conjunction with the accompanying drawings illustrating the invention, of which there are four sheets and one embodiment.

DESCRIPTION OF THE PREFERRED EMBODIMENT

Figure 1:
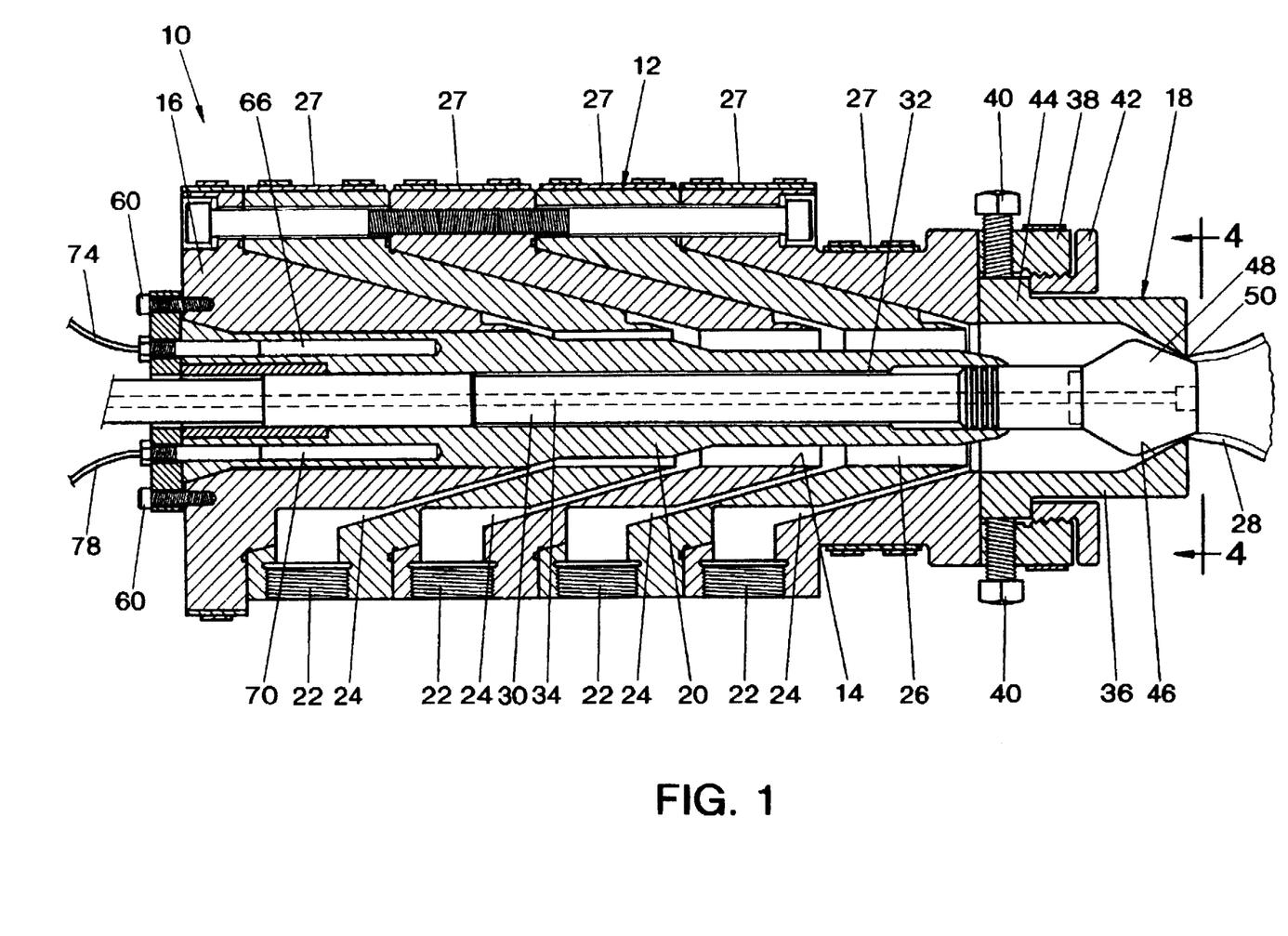
FIG. 1 is a sectional view taken through the longitudinal axis of a die head according to the invention and along line 1—1 of FIG. 3.

Extrusion die head 10 includes an annular body 12 defining an interior cylindrical passage 14 extending from the base end of the body 16 to a parison extrusion die 18 at the extrusion end of the body. Mandrel 20 is mounted on the base end of the body and extends axially along passage 14 toward the extrusion die 18. A plurality of resin inlet ports 22 are provided on one side of body. Flow passages 24 extend from the ports around the mandrel and open into an annular flow channel 26 defined by bore 14 and mandrel 20. A plurality of band heaters 27 surround the outside of body 12 to maintain the head at an operating temperature sufficiently high to permit the desired flow of resin through ports 22, passages 24, flow channel 26 and out die 18 as a parison 28.

Elongate blow pin stem 30 is slidably mounted in axial bore 32 in mandrel 20. The end of the stem extending from the base end of body 12 is connected to a stem controller (not illustrated) which extends and retracts the stem in the body as required to vary the thickness of parison 28. Air passage 34 extends along the length of stem 30 to flow air into the interior of the parison.

Extrusion die 18 includes a cylindrical die bushing 36 mounted on the extrusion end of body 12 in mounting ring 38. The ring is bolted to the end of the body. Four radial adjustment bolts 40 are threadably mounted on the ring 38 at 90-degree spacing around the ring and extend inwardly through the ring to engage bushing flange 44. Clamp nut 42 threadably engages the flange to hold the bushing flush against the end of the body. The interior wall 46 of the die bushing cooperates with die pin 48 on the end of stem 30 to define a generally-circular die opening 50 for parison 28.

Figure 2:
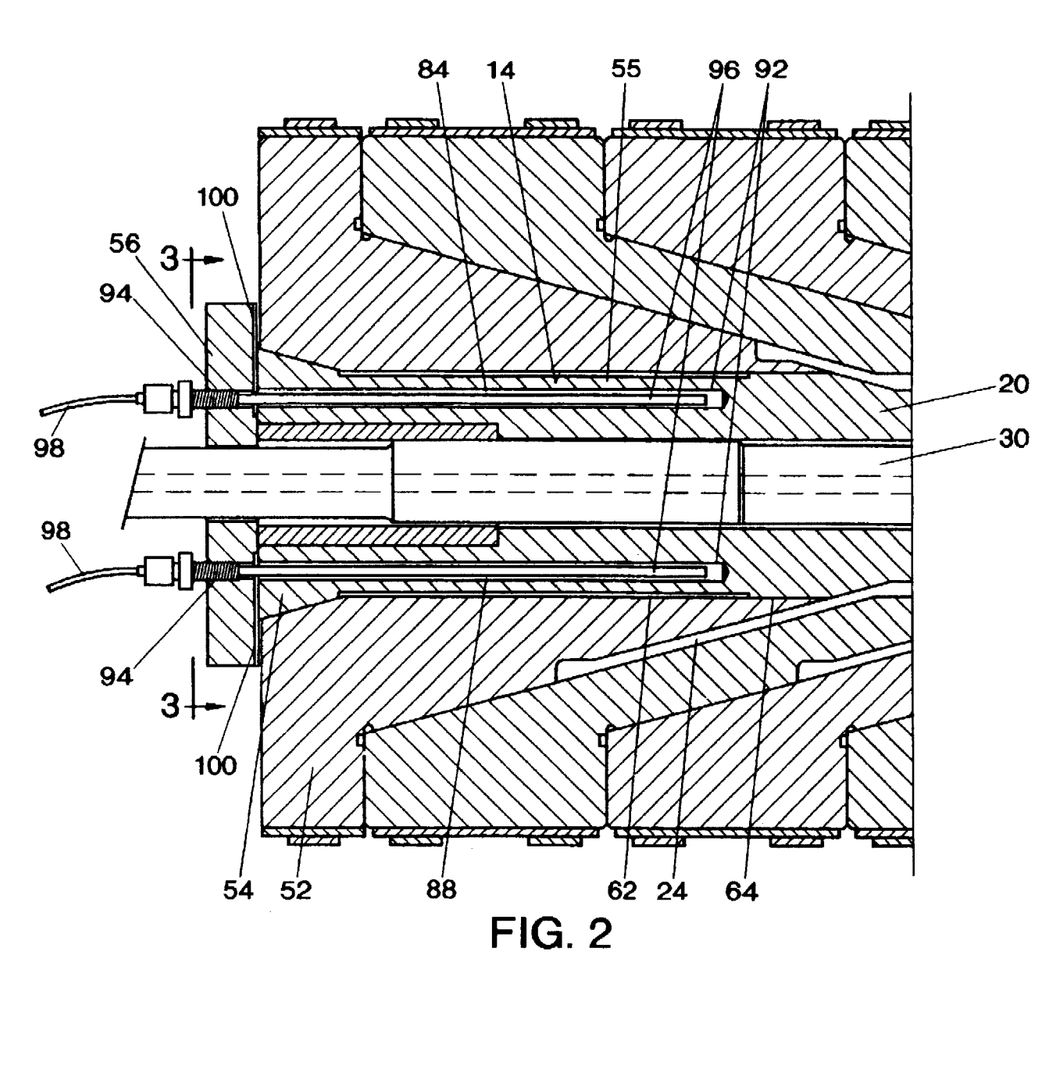
FIG. 2 is an enlarged sectional view similar to FIG. 1 taken along line 2—2 of FIG. 3.

The base end of body 12 and warp portion 55 of the mandrel are shown in FIG. 2. The base end of cylindrical bore 14 extends through base member 52 in body 12. The end of the bore 14 is conically outwardly tapered and tightly receives complementary conical plug 54 on the base end of the mandrel. The plug projects a distance above the end surface of base member 52. Mounting plate 56 rests flush on the end of the plug above member 52. A plurality of bolts 58, shown in section in FIG. 3, extend through the plate, and secured the plate to the end of the mandrel. A second plurality of bolts 60 extend through the plate and threadably engage the base member 52 to hold the plug tightly against the corresponding recess in the base member and thereby mount the base end of the mandrel in place on body 12 in axial alignment with bore 14.

The warp portion 55 of the mandrel extends from the plug 54 in a down-stream direction toward the first flow passage 24 and is cylindrical, as shown in FIG. 2. The portion of bore 14 from base member 52 downstream to a distance just short of the adjacent flow passage 24 has a slightly greater diameter than the diameter of the warp portion 55 to define cylindrical gap 62 separating the mandrel and base member 52. Gap 62 may have a width of about 0.030 to 0.040 inches for a mandrel having a diameter of about 3.25 inches. In FIG. 2, the width of cylindrical gap 62 is exaggerated for purposes of clarity. The diameter of the portion 64 of bore 24 extending from the end of gap 62 away from plug 54 to the adjacent flow passage 24 is about 0.001 inch greater than the diameter of mandrel 20 to provide a tight seal against resin flowing up along the mandrel from the adjacent passage 24.

Figures 3, 4, 5:
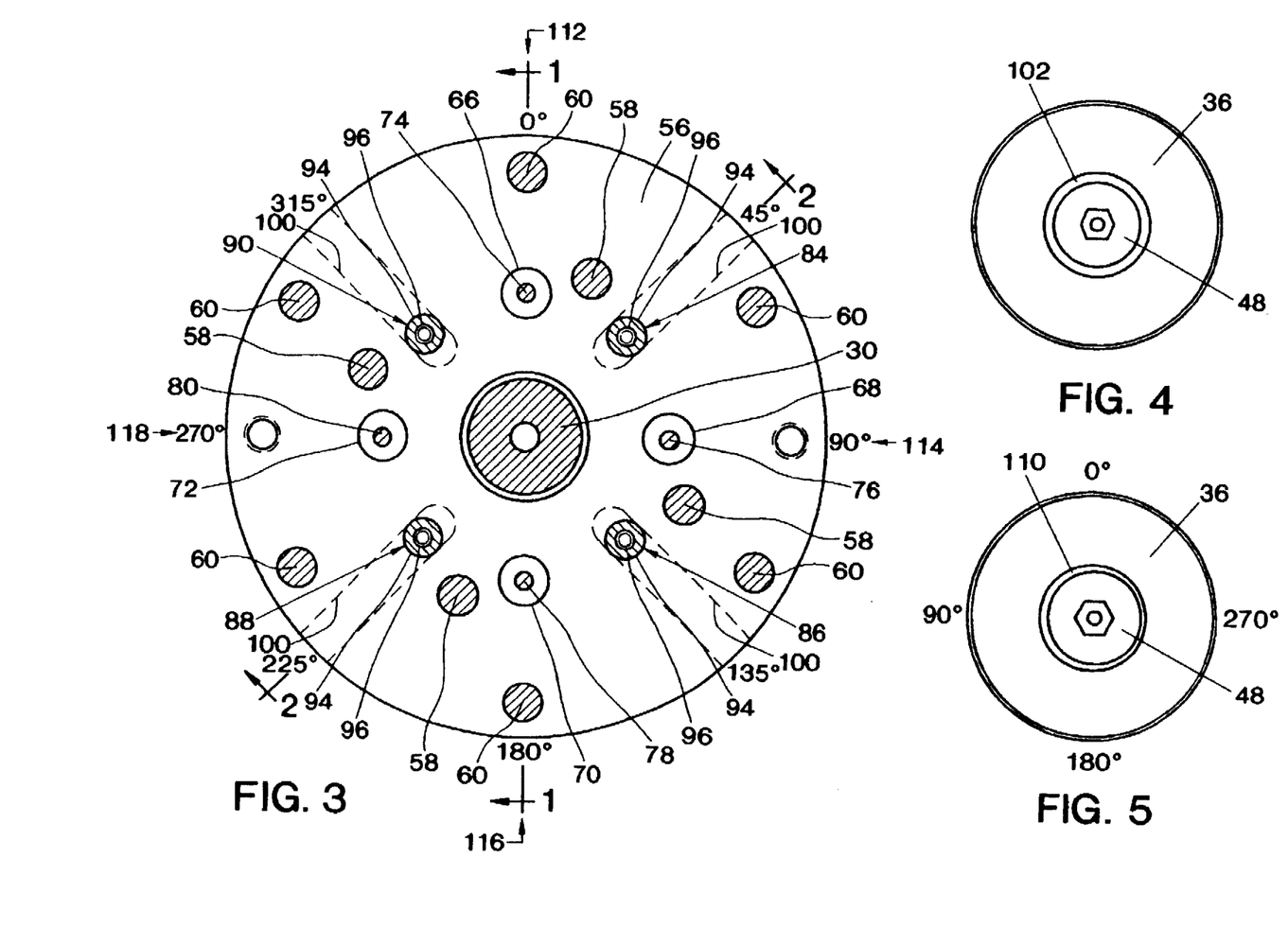
FIG. 3 is a partial sectional view taken along line 3—3 of FIG. 2.
FIGS. 4 and 5 are views taken along line 4—4 of FIG. 1 showing different positions of the die pin in the die bushing.
Figure 6:
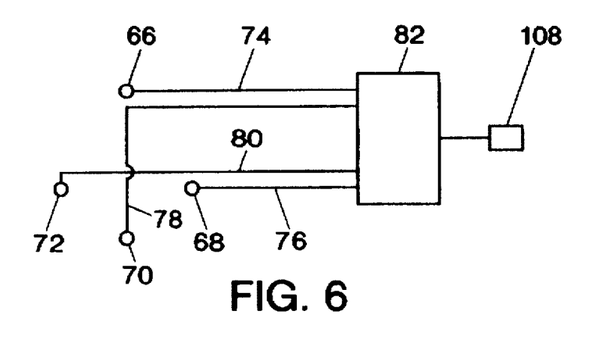
FIG. 6 is a diagrammatic view illustrating the control system for positioning the die pin.

As shown in FIGS. 1 and 3, four like electric resistance heaters 66, 68, 70, and 72 are fitted in axially extending bores formed in the thickness of the warp portion 55 inside of the cylindrical gap 62. The heaters are spaced 90 degrees apart in quadrants or sections 112,114,116, and 118 spaced around the axis of die head 10 with heater 66 at the 0 degree position in section 112, heater 68 at the 90 degree position in section 114, heater 70 at the 180 degree position in section 116, and heater 72 at the 270 degree position in section 118. See FIG. 3. Electrical leads 74, 76, 78, and 80 connect the resistors to a programmable logic controller 82 shown in FIG. 6. The heaters are mounted on elongate bodies extending through bores in the mounting plate and are threaded in place by bolts secured to the mounting plate.

Four air flow heat sinks 84, 86, 88, and 90 are located in the wrap portion 55 of the mandrel between adjacent heater quadrants. The heat sinks are circumferentially spaced 90 degrees apart between adjacent quadrants. Each heat sink includes a bore 92 extending through plug 54 and into the portion 55 of the mandrel parallel to the axis of the head. The bores extend parallel to the heaters 66–72. The bores extend along the lengths of the heaters and overlie gap 62 between the warp portion of the mandrel and member 52. Four bores 94 are formed in the mounting plate 56 overlying bores 92. Small diameter air flow tubes 96 are mounted in bores 94 and extend along the length of the larger diameter bores 92 in the warp position of the mandrel. The inner ends of tubes 96 are spaced a short distance from the bottoms of the bores 92 as illustrated in FIG. 2. Air hoses 98 connect the ends of tubes 96 at plate 56 to a source of compressed fluid or gas, which may be compressed air, (not illustrated). A radially oriented air discharge groove 100 is formed on the inner surface of plate 56 at the end of each bore 92 and overlies the end of the bore. The grooves extend from the bores to the outer circumference of plate 56 to provide exit passages for air flowed into the bores through tubes 96. The heat sinks each include an inlet passage, a heat transfer passage in a quadrant and an outlet passage. The inlet and outlet from passages extend out the mandrel.

During initial set-up of head 10, bolts 40 are tightened and loosened as required to position die bushing 36 co-axially with die pin 48 to define a circumferential die opening 102 of uniform width, as shown in FIG. 4. The bushing is then secured on the die end of body 12 in this position by nut 42. The body is heated to an appropriate extrusion temperature and molten thermoplastic resin is flowed through the resin inlet ports 22, around mandrel 20 and out the die opening to form a multilayer parison. The blow pin stem 30 is extended and retracted to vary the thickness of the parison as required during blow molding of the parison to make bottles.

Figure 7:
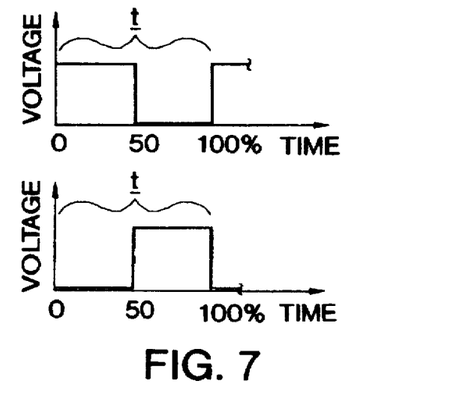
FIGS. 7 and 8 are pairs of graphs illustrating the on-time of opposed pairs of heaters in the base of the mandrel.
Figure 8:
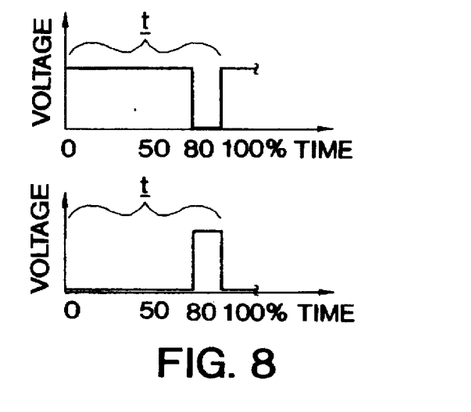
Figure 9:
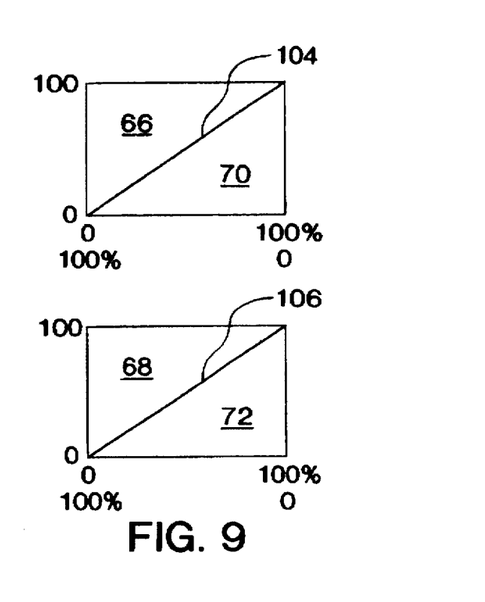
FIG. 9 is a pair of graphs illustrating the on-time for the heaters at different settings of the control system shown in FIG. 6.

FIGS. 7–9 illustrate operation of the programmable logic controller 82. The controller adjusts the location of the mandrel in the die bushing in response to operator input by changing the on/off times for each opposed pair of heaters and varying the amounts of heat and thermal elongation for opposed quadrants of the warp portion 55. The controller operates on a repetitive cycle and is programmed to selectively maintain a voltage across or turn on one or both of each pair of opposed heaters 66 and 70, and 68 and 72 during each cycle of operation. The cycles are preferably relatively short in time, about 10 seconds in duration. FIGS. 7 and 8 are graphs showing examples of the on and off periods for a pair of opposed heaters.

FIG. 9 includes two graphs illustrating operation of the programmable logic controller. The upper graph in FIG. 9 illustrates the operation of the controller with regard to heaters 66 and 70. The vertical axis indicates the amount of time during each cycle of operation that the controller turns a heater on. The vertical heights of the two triangular fields 66 and 70 shown in the graph indicate the percentage of the cycle during which the respective heater is turned on. The lower graph of FIG. 9 is similar to the upper graph but is for heaters 68 and 72. As indicated in the FIG. 9 graphs, each heater in a pair of opposed heaters is on from 0 percent to 100 percent of each cycle, with the other heater turned on for the remainder of the cycle, if any.

FIG. 7 is two graphs showing an example division of on-time during one cycle of operation of the programmable logic controller for diametrically opposed heaters 66 and 70. The complete cycle has a time t. The controller is set to turn each of the heaters on for one-half of the cycle. In the upper graph for heater 66, the heater is on for the first 50 percent of the cycle and is off for the remaining 50 percent of the cycle. The lower graph of FIG. 7 is for heater 70 and shows that the heater is off for the first 50 percent of the cycle and on for the second 50 percent of the cycle. The setting indicated in FIG. 7 corresponds to point 104 shown in the upper graph of FIG. 9 and corresponds to the initial set-up setting of the programmable logic controller 82, as will be described. At this set-up setting the controller also turns each heater 68 and 72 on for 50 percent of the duration of each cycle, corresponding to point 106 in the lower graph of FIG. 9.

FIG. 8 illustrates another example setting of the controller for a pair of opposed heaters. The upper graph shows that one of the heaters is on for 80 percent of each cycle t and the lower graph shows that the other heater is on for the remaining 20 percent of the duration of each cycle t.

The amount of heat generated by a heater 66, 68, 70, 72 and flowed into the warp portion is directly proportional to the amount of time the heater is turned on by the controller. The controller 82 includes an input panel 108 which permits the operator to set the relative amounts of heat supplied to each of the opposed pairs of heaters 66, 70, and 68, 72 with great precision in order to control the position of the die pin in the bushing very accurately.

The position of the die pin 48 in bushing 36 is controlled by varying the amounts of heat supplied to the four heaters in the warp portion. The die pin is maintained in the set-up position by programming the controller so that each opposed pair of heaters 66, 70, and 68, 72 is turned on during 50 percent of each cycle and receives the same amount of heat. Each 90 degree quadrant of the warp portion 55 receives the same amount of heat, is heated to the same temperature and is thermally elongated by the heat an equal distance so that the mandrel is elongated and not thermally warped.

Uniform thermal expansion of portion 55 extends the end of the mandrel downstream a slight distance without shifting the longitudinal position of the pin stem 30 or die pin 48 and without laterally shifting the position of the die pin in the die bushing 36.

Adjustment of the position of the die pin will be described referring to the positions of the heaters around the axis of head 10, with heater 66 at the zero degree position and in the upper quadrant 112, opposed heater 70 at the 180 degree position and in the lower quadrant 116, and heater 68 at the 90 degree position and in the right hand quadrant 114, and opposed heater 72 at the 270 degree position and in the left hand quadrant 118. The upper quadrant 112 extends from 315 degrees to 45 degrees, the right hand quadrant 114 extends from 45 degrees to 135 degrees, the lower quadrant 116 extends from 135 degrees to 225 degrees, and the left quadrant 118 extends from 335 degrees to 315 degrees. See FIG. 3.

When it is desired to move the die pin toward the 180 degree position, the PLC 82 is adjusted by the operator to increase the on-time for heater 66 in the upper quadrant 112 and corresponding decrease the on-time for heater 70 in the lower quadrant 116. The adjustment may be that the heater 66 is on for 80 percent of the time, as indicated in the upper graph of FIG. 8 and heater 70 is on for only 20 percent of the cycle, as indicated by the lower graph of FIG. 8. The effect of this adjustment is that a greater amount of heat is flowed into the upper quadrant of the warp portion than before and a reduced amount of heat is flowed into the lower quadrant of the warp portion than before. After a period of time for thermal adjustment, which may be a few minutes, the upper quadrant of the warp portion is heated to a higher temperature by the additional supplied energy and elongates, and the lower quadrant of the mandrel relatively cools and correspondingly retracts. This elongation and retraction warps or bends the portion 55 in gap 62 so that the outer end of the mandrel is swung down toward the 180 degree position and the die pin on the end of stem 30 is correspondingly moved or swings toward the 180 degree position in the die opening. The upper and lower quadrants of the warp portion warp or bend the portion down in gap 62 toward the zero degree position.

The distance the die pin is moved down in the bushing corresponds to the relative times the two heaters 66 and 70 are on, that is, to the differences in the amounts of heat supplied to the upper and lower quadrants of the warp portion. The greater the time heater 66 is on and the less time the heater is off, the greater the movement of the die pin toward the 180 degree position.

Die pin 48 may be moved toward the zero degree position by turning heater 70 on for a greater percentage of time during each cycle than heater 66, in the manner described previously.

The die pin may be moved toward either the 90 degree or 270 degree positions by correspondingly varying the amounts of heat flowed into the right and left hand quadrants of portion 55 by heaters 68 and 72, in the same manner as described with regard to varying the position of the die pin in the 0 degree and 180 degree directions.

The programmable logic controller varies the amount of on time for each pair of opposed heaters, 66 and 70, and 68 and 72 independently so that the operator can easily and repeatably position the die pin at a given location in the die bushing to meet a given operating parison thickness requirement. FIG. 5 shows die pin 48 moved toward the 270 degree position. This position is achieved by setting the programmable logic controller to turn on the 0 and 180 degree heaters 66 and 70 each 50 percent of the time of each cycle and turning on heater 68 at the 90 degree position for a percentage of each cycle greater than the percentage during which 270 degree heater 72 is turned on. The distance the pin moves depends upon the differential in the amount of heat supplied to the two heaters located in the plane of movement. The die opening 110 has a minimum width at 270 degrees and a maximum width at 90 degrees.

During operation of the head 10, air is flowed from the air source (not illustrated) through the four air hoses 98, down tubes 96 to the inner ends of bores 92 and out the bores through the annular spaces surrounding the tubes. The air contacts the warp portion, is heated and withdraws heat from the warp portion at the intersection of the heated quadrants. The air exits the head through grooves 100 in the mounting plate 56. The heaters 66, 68, 70, and 72 supply appreciable amounts of heat to the quadrants in the warp portion. If not removed, this heat will flow from the warp portion into the body of head 10 and may increase the temperature of resin flowing through the head, particularly resin flowing through the inlet port 22 and flow passage 24 adjacent the warp portion. The additional heat may undesirably raise the temperature of resin and may destroy the heat balance of the head maintained by band heaters 27.

In such circumstance, the flow of air through the four heat sinks 84, 86, 88, and 90 is adjusted to remove all of the amount of heat supplied by the four heaters from the head, thereby maintaining the heat balance. The controller supplies heat to the warp portion at a constant rate, independent of how the supplied heat is divided between the heaters in each opposed pair of heaters, 66 and 70, and 68 and 72. The rate of air flowing through the heat sinks 84, 86, 88, and 90 may be adjusted to remove all of the heat supplied by the heaters, independent of the on-times of the individual heaters. In this way, the position of the die pin can be adjusted by the controller 82 and all heat supplied by the heaters is removed by the heat sinks without the necessity of correspondingly adjusting the air flow through the heat sinks. The heat sinks also thermally isolate the four quadrants in the warp portion to limit undesired heat flow between adjacent quadrants.

In some applications, when high temperature thermoplastic resin is flowed through head 10, it may be desirable to prevent air flow through hoses 98 and deactivate the heat sinks 84-92 so that heat supplied to the warp portion of the mandrel flows outwardly of the mandrel and into the base of the head 10 to aid in maintaining the resin at a desired high temperature. For instance, the air flow through the heat sinks may be turned off when high temperature nylon is flowed through the adjacent port 22 and passage 24.

Gap 62 provides a physical separation between the warp portion 55 of the mandrel and surrounding die head body 12 and provides space for lateral warping of the mandrel, as previously described. The gap also thermally insulates the warp portion of the mandrel from the surrounding body so that the heat supplied by the resistance heaters to control the length of the segments does not flow directly outwardly into the body and away from quadrants. The gap helps to maintain the desired temperature of the quadrants, and corresponding axial length of the quarters for warping. If desired, a thermal insulator may be provided in the bore 14 on the outside of the gap and overlying the warp portion to further limit outward radial loss of heat from the heated quadrants.

The invention has been described in connection with a coextrusion die head 10 used to extrude a parison for blow molding bottles. However, the invention is not limited to a head of this type but is useful in other types of die heads for extruding elongate hollow bodies through a die opening defined by the space between a die bushing and a surrounded die pin. For instance, the invention is useful in die heads used to extrude elongate bodies of various sizes and cross-sectional shapes, such as cylindrical, square, and triangular tubes. Additionally, the invention is not limited to a die head with the mandrel having four quadrants or sections as disclosed. The mandrel may have as few as three equally-spaced sections with heaters in each section or may have more than four sections, with a suitably programmed controller for turning the heaters on as required to thermally elongate or contract the segments and properly position the die pin.

Electric resistance heaters are used to elongate and contract the four quadrants in die head 10. Other types of heaters are contemplated, including, for instance, a hot fluid heater in which hot oil or other fluid is flowed to and from the segment through insulated passages. The oil would pass through a heat transfer passage to flow heat directly into the adjacent segment. The fluid heaters could be similar to the disclosed heat sinks. The insulated inlet and outlet passage would open through the base end of the mandrel.

While I have illustrated and described a preferred embodiment of my invention, it is understood that this is capable of modification, and I therefore do not wish to be limited to the precise details set forth, but desire to avail myself of such changes and alterations as fall within the purview of the following claims.

What I claim as my invention is:

1. An extrusion die head including:
a) a body having a die end, a base and a passage extending from the base to the die end;
b) a die bushing on the die end of the body;
c) an elongate mandrel positioned in the passage, the mandrel including a first end mounted in the base of the body, a free end adjacent the die bushing and a warp portion located between the first end and the free end, the warp portion comprising a number of segments arranged around the mandrel, each segment having a length along the mandrel and a thermal coefficient of expansion;
d) a die pin on the free end of the mandrel, the die pin extending into the die bushing, the die pin and die bushing defining an annular die opening therebetween; and
e) a plurality of heat sources, each heat source associated with one of the segments of the warp portion of the mandrel whereby relative heating or cooling of said segments by the heat sources bends the warp portion of the mandrel and swings the die pin in the die bushing to change the shape of the die opening.

2. An extrusion die head as in claim 1 wherein said warp portion is made from metal and each heat source comprises a heater in contact with a segment of the warp portion.

3. An extrusion die head as in claim 2 wherein the warp portion is cylindrical and each segment includes a passage extending along the length of the mandrel, and said heat sources are located in said passages.

4. An extrusion die head as in claim 3 wherein said heat sources are electric resistance heaters, and including an electrical lead extending from each resistance heater out from the head.

5. An extrusion die head as in claim 4 including a plurality of heat sinks, each heat sink being located between two adjacent segments of the warp portion.

6. An extrusion die head as in claim 5 wherein each heat sink includes a heat transfer passage contacting two adjacent mandrel segments, a fluid inlet passage and a fluid outlet passage, said inlet and outlet passages opening outside the head.

7. An extrusion die head as in claim 6 wherein one of said inflow and outflow passages is located inside said heat transfer passage.

8. An extrusion die head as in claim 1 wherein said portion includes at least three segments.

9. An extrusion die head as in claim 8 wherein said heat sources comprise electric resistance heaters.

10. An extrusion die head as in claim 9 wherein said electric resistance heaters are located in said segments.

11. An extrusion die head as in claim 10 wherein said segments comprise four 90 degree quadrants, each quadrant having the same length along the mandrel.

12. An extrusion die head as in claim 11 including a plurality of heat sinks spaced around the portion of the mandrel between adjacent segments.

13. An extrusion die head as in claim 12 wherein said heat sinks are located in the mandrel.

14. An extrusion die head as in claim 13 wherein each heat sink includes a fluid flow passage having an inlet end at the base of the mandrel and an outlet end at the base end of the mandrel.

15. An extrusion die head as in claim 12 including a central bore extending along the length of the mandrel, a stem in the bore and extending outwardly of the free end of the mandrel, said die pin being mounted on the end of the stem.

16. An extrusion die head as in claim 8 including a gap in the passage at the warp portion.

17. An extrusion die head as in claim 16 wherein said gap overlies said segments.

18. An extrusion die head as in claim 17 including a physical connection between the mandrel and the body located between the gap and the free end of the mandrel.

19. An extrusion die head as in claim 18 wherein said gap extends circumferentially around the portion of the mandrel.

20. An extrusion die head as in claim 19 wherein said connection extends circumferentiallly around the mandrel immediately adjacent said portion and including a physical connection between the base end of the mandrel and the base of the body.

21. An extrusion die head as in claim 11 including four resistor heaters, each located in one quadrant, a controller, electrical connections joining the controller and the four resistance heaters, said heaters including two diametrically-opposed pairs of heaters, the controller having a timing cycle duration of t, and a circuit for a) turning on a first heater of the first pair of heaters for a time equal to X % of t and turning on the second heater of the first pair for a time equal to (100-X) % of t; and b) turning a first heater of the second pair of heaters for a time equal to y % of t and turning on the second heater of the second pair of heaters for a time equal to (100-y) % of t.

22. A mandrel for use in a die head for extruding a plastic body through an annular die opening, the die head having a body with a base, a die end away from the base, a mandrel passage in the body extending between the base and the die end, a die bushing at the die end of the body, and a die pin in the bushing to define the die opening therebetween; the mandrel including an elongate generally cylindrical metal body adapted to be fitted in the passage and including a first end, a free end, a warp portion adjacent the first end, such portion comprising a number of segments spaced around the mandrel, and a plurality of heaters in the mandrel with each heater located in a segment of the mandrel, said segments having thermal co-efficients of expansion along the length of the mandrel whereby differential heating of the segments by the heaters bends the warp portion of the mandrel and swings the free end of the mandrel relative to the first end of the mandrel.

23. A mandrel as in claim 22 wherein said segments comprise four spaced 90 degree quadrants.

24. A mandrel as in claim 22 wherein said heaters comprise electric resistance heaters and including an electric lead connected to each heater and extending outwardly from the base end of the mandrel.

25. A mandrel as in claim 24 including a plurality of heat sinks, each heat sink being located in the mandrel between a pair of adjacent segments.

26. A mandrel as in claim 25 wherein each heat sink includes a fluid flow passage having an inlet end and an outlet end at the base of the mandrel.

27. A mandrel as in claim 26 including a pivot surface located between the segments and the free end.

28. The method of changing the shape of a die opening in an extrusion die head of the type having a body with a die end, a base end and a passage extending between the base end and the die end, a die bushing on the die end of the body, a mandrel in the passage having a first end secured to the base end of the body and a free end, and a die pin on the free end of the mandrel located in the die bushing to define an annular die opening, comprising the steps of:

A) selectively bending a portion of the mandrel located between the first end and the free end; and B) swinging the die pin to a desired location in the bushing in response to bending of the portion of the mandrel.

29. The method of claim 28 wherein the portion of the mandrel includes a number of segments circumferentially spaced around the mandrel, including the step of, C) performing step A) by relatively elongating or foreshortening a number of segments.

30. The method of claim 29 including the step of heating or cooling and thermally expanding or contracting at least one of said circumferentially spaced mandrel segments.

31. The method of claim 29 including the steps of elongating or shortening a pair of diametrically opposed segments of said mandrel.

32. The method of claim 29 including the step of heating said segments.

33. The method of claim 32 including the step of withdrawing the heat from said segments from the mandrel and flowing that heat away from the die head.

34. The method of claim 33 including the step of withdrawing said heat from the segments at locations between adjacent segments.

35. The method of claim 33 including the step of withdrawing an amount of heat from the portion equal to the amount of heat supplied to the segments.

36. An extrusion die head as in claim 1 including a plurality of heat sinks, each heat sink being located between two adjacent segments of the warp portion.

37. An extrusion die head including an annular body having a base end, an extrusion end, a base member at the base end and an interior passage extending through the body from the base member to the extrusion end; a mandrel in the passage, said mandrel including an end portion mounted in the base member and a free end adjacent the extrusion end of the body, said end portion of the mandrel including a number of segments arranged around the mandrel and each having a thermal co-efficient of expansion, said passage and mandrel defining an annular flow channel extending from the base member to the free end of the mandrel; a die bushing on the extrusion end of the body; a die pin on the free end of the mandrel, the die pin extending into the die bushing, said pin and bushing defining an annular die opening therebetween at an end of the flow channel; a plurality of heat sources, each heat source associated with one of said segments whereby differential heating of the segments by the heat sources bends the end portion of the mandrel and swings the die pin in the die bushing to vary the shape of the die opening.

38. An extrusion die head as in claim 37 wherein the heat sources are located in the segments and including a gap extending around the mandrel overlying said segments.

39. An extrusion die head as in claim 38 including a resin seal extending around the mandrel between the gap and the flow channel.

40. An extrusion die head as in claim 37 wherein said mandrel is cylindrical.

41. An extrusion die head as in claim 37 including heat sinks located between adjacent heat sources.

42. An extrusion die head as in claim 41 wherein said heat sources and said heat sinks are located in the mandrel.

43. An extrusion die head as in claim 37 wherein said heat sources comprise electric resistance heaters in the mandrel.

44. An extrusion die head as in claim 43 including heat sinks located between adjacent resistance heaters.

45. An extension die head as in claim 37 including opposed pairs of heat sources.

46. An extrusion head as in claim 37 including four 90 degree spaced heat sources in the mandrel.

* * * * *

UNITED STATES PATENT AND TRADEMARK OFFICE
CERTIFICATE OF CORRECTION

PATENT NO. : 5,674,440
DATED : October 7, 1997
INVENTOR(S): Paul W. Klinedinst

It is certified that error appears in the above-identified patent and that said Letters Patent are hereby corrected as shown below:

In the Specification:

Column 1, line 50, change "stick slip" to --stick-slip--.

Column 3, line 66, change "down-stream" to --downstream--.
Column 4, line 29, change "wrap" to --warp--.
Column 4, line 40, change "position" to --portion--.
Column 4, line 44, following "air" delete ",".
Column 4, line 51, following "outlet" delete "from".

Column 6, line 17, change "corresponding" to --correspondingly--.

Column 7, line 57, change "quarters" to --quadrants--.

In the Claims:

Claim 20, line 2, change "circumferentiallly" to -- circumferentially--.

Signed and Sealed this

Second Day of June, 1998

*Attest:*

BRUCE LEHMAN

*Attesting Officer*  Commissioner of Patents and Trademarks

Disclaimer

5,674,440—Paul W. Klinedinst, Winsor, PA. DIE HEAD WITH ADJUSTABLE MANDREL AND METHOD. Patent dated Oct. 7, 1997. Disclaimer filed June 12, 2002 by Assignee, Graham Engineering Corporation.

Hereby enters this disclaimer to claims 1 to 4; 8 to 11; 16; 22 to 24; 28 to 32; 37; 40; 43; 45 and 46, of said patent.

*(Official Gazette, June 19, 2007)*